United States Patent Office 3,072,550
Patented Jan. 8, 1963

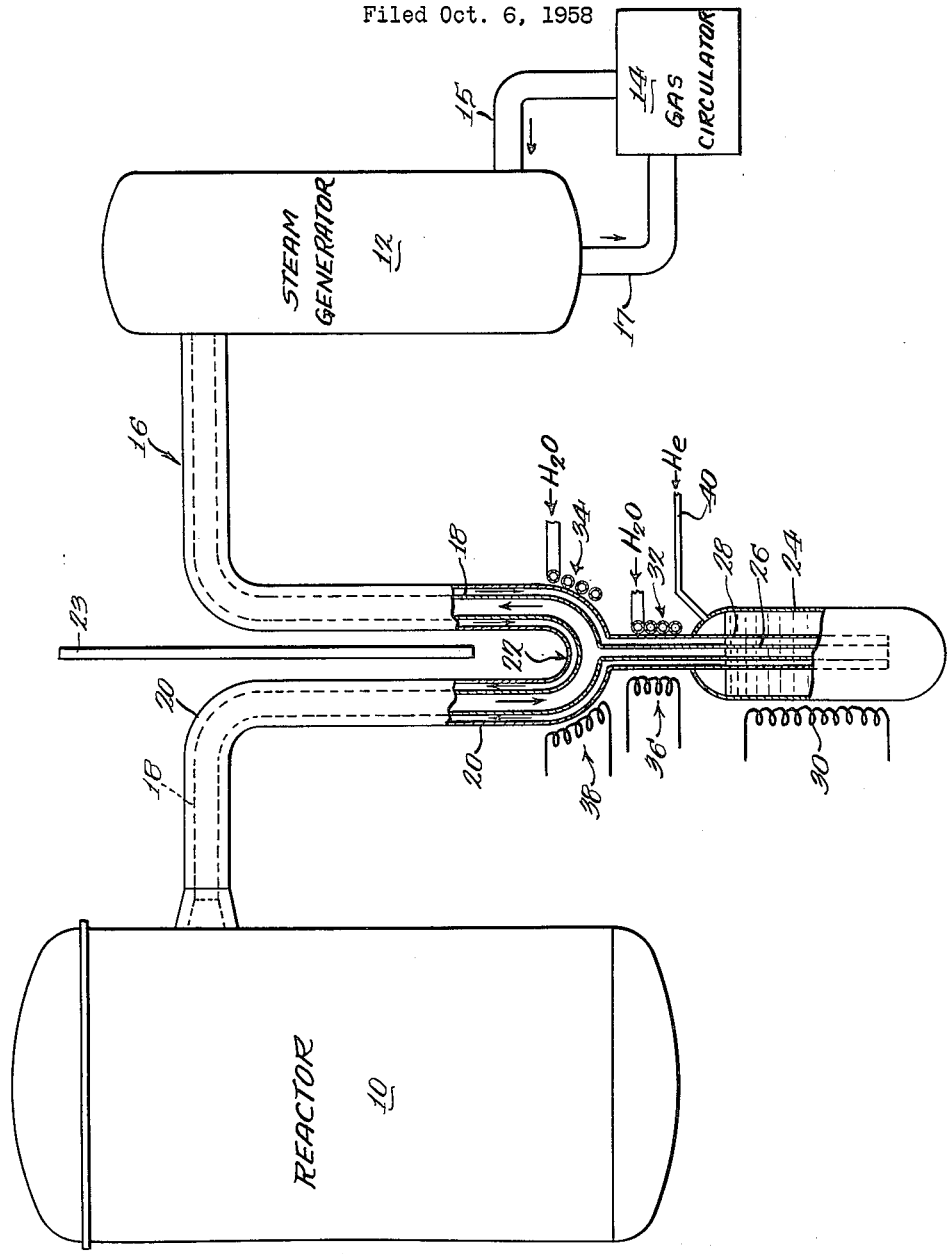

3,072,550
REACTOR SYSTEM AND CONTROL VALVE
Peter Fortescue, La Jolla, Corwin Rickard, Solana Beach, and David Rose, San Diego, Calif., assignors, by mesne assignments, to the United States of America as represented by the United States Atomic Energy Commission
Filed Oct. 6, 1958, Ser. No. 765,544
4 Claims. (Cl. 204—193.2)

The present invention relates generally to control valves and is more particularly directed to a novel and improved form of valve means for controlling the flow of gaseous fluid through a passage or conduit.

In apparatus which involves the flow of gases at relatively high temperatures and/or pressures, it is often quite difficult to provide a satisfactory valve for controlling the flow of such gases. This problem is particularly great with respect to controlling the flow of hot gases, wherein the gases are conducted through a single duct or exchanged through a plurality of ducts which may be arranged concentrically.

It is a primary object of the present invention to provide an improved and novel form of control valve means for controlling the flow of gaseous fluids through a duct or conduit. A further object of the invention is to provide an improved control valve means which is especially adaptable for use in controlling the flow of gas through a plurality of concentrically arranged conduits. Still another object of the invention is to provide a novel form of control valve, which utilizes a material which may be conveniently transformed between a solid state and a liquid state, in combination with a U-bend in the conduit to be controlled and means for selectively heating and cooling said material and placing the material in controlling relation to the gases flowing through the U-bend. Another object is to provide a valve means for controlling the flow of gases through a plurality of concentrically arranged conduits, which includes a source of liquefiable material in fluid communication with the conduits, means for selectively introducing the material in a liquid state in flow controlling relation to the conduits, and including means for selectively heating and cooling the liquefiable material of the valve means.

Other objects and advantages will be apparent from the following description of a selected embodiment of the invention, which is illustrated schematically in the accompanying drawing.

Although there are many uses for this invention, it has found particular use in connection with the control of the gases circulated in a gas cooled neutronic power reactor and, therefore, is illustrated in connection with such apparatus. In a neutronic reactor which is designed to provide a heated gas as a source of power, the gases flowing in the system are at substantial pressures and temperatures. Moreover, it is necessary that a safe and effective valve means be provided in the gas circulating system for closing off the gas ducts intermediate the reactor vessel and the associated energy conversion unit, such as a steam generator or the like. Mechanical valves of known design are not too effective or sufficiently durable for this purpose.

There has recently been designed an improved form of gas cooled reactor, wherein advantageous use is made of a concentric arrangement for the gas inlet and gas outlet pipes for the reactor. In this novel system, the high temperature gases leaving the reactor vessel are passed through a duct or conduit providing for the passage of cooled gas into the reactor. Such arrangement is more fully described in the copending application Serial No. 765,545, which is also assigned to the assignee of the present invention. The present invention is particularly illustrated and described with respect to a valve means for controlling the flow of gases through concentric ducts such as those referred to above.

Generally, the flow of hot gases through a plurality of concentric ducts is controlled through the use of a material, such as an organic compound, an inorganic salt, or a suitable metal, which is conveniently transformable between a liquid state and a solid state. Such material is arranged in a system that is subject to controlled heat and pressure, in a manner such that the material in its liquid state is selectively moved relative to a U-bend in the ducts to thereby control the flow of gases through the ducts.

As illustrated in the drawing, the reactor system includes the reactor vessel 10, one or more steam generators 12, a source 14 of gas coolant for circulating gas under pressure through the reactor system, and suitable conduit means 16 for conveying the coolant between the steam generators and the reactor vessel. In the illustrated system, the gas is first passed from the gas circulator 14, containing helium or other suitable gas coolant, through a conduit 15 to the steam generator 12 and thence through conduit means 16 to the reactor vessel 10. The conduit means 16 between the generator and the reactor vessel includes concentrically arranged ducts 18 and 20, wherein the outer duct 20 conveys the cooler gases to the reactor vessel 10 and the inner duct 18 conveys the heated gases into the stem generator 12 where they are used in the production of steam and then passed back to the gas circulator through the conduit 17.

Preferably, each of these concentric ducts 18 and 20 is provided with a downward bend or elbow portion 22, in order to provide for expansion of the ducts at various times, and this bend in the concentric ducts is utilized in connection with the present invention. By providing the bend 22 in the concentric ducts there is thereby provided a shield or trap for preventing the direct flow of particles between the reactor vessel 10 and the steam generator 12. In addition, the bend 22 affords the positioning of a neutron and gamma shield 23 between the resulting two straight sections of conduit 16 to prevent the direct streaming of neutrons and gamma particles from the reactor vessel through the conduit 16. The shield 23 may be of any suitable material such as cadmium, boron, concrete and the like.

Furthermore, it is often desirable to isolate the reactor vessel from the remainder of the system, which requires stopping the flow of gases between the reactor vessel and the steam generators, and the bend 22 in conduit 16 is also utilized to accomplish this latter purpose. More particularly, a novel form of valve means utilizing the selective positioning of liquified material in the bend 22 in the concentric gas ducts provides very satisfactory means for controlling the flow of gases in the ducts. In the illustrated embodiment, this valve means includes a tank 24 containing therein a liquifiable material, such as a lead alloy, type metal or the like, or a high temperature salt, for example, an alkali nitrate-nitrite mixture type fused salt, or a suitable organic compound such as triphenylamine. A pair of concentric feed pipes 26 and 28 extend from the lower portion of the tank into the U-bend 22 of the concentric ducts. The inner feed pipe 26 communicates with the inner duct 18, and the outer feed pipe 28 leads into the outer duct 20. In order to keep the liquifiable material in the storage tank in a liquid condition, in readiness for flow relative to the concentric ducts 18 and 20, there is provided a suitable heating means, such as an electrical heating coil 30 disposed adjacent to the storage tank 24. In the use of this valve means as a control for the flow of gases in a neutronic reactor system, it is desirable, if not essential, that the material in the storage tank be maintained in a liquid state at all times in readiness to shut off the flow of gas through the concentric ducts.

For shut down periods of any duration for the reactor, it may be desirable to freeze or solidify the material in the feed pipes 26 and 28 and/or in the U-bend 22 of the ducts 18 and 20, and, therefore, it is preferable that suitable cooling means be provided adjacent each of these portions of the system. Such cooling means may comprise a series of coils through which water or some other suitable coolant is passed and such cooling circuit is indicated at 32 and 34 in connection with the feed pipes and the gas ducts, respectively. It is also desirable that suitable means be provided for liquifying or maintaining the material in its liquid state in both the feed pipes and the concentric ducts and, therefore, additional heating elements 36 and 38, respectively, are provided adjacent the feed pipes and the gas ducts. Thus, it is seen that while the liquifiable material is normally maintained in a liquid state within the storage tank 24, the material when it is in the upper portions of the feed pipes 26 and 28, as well as in the U-bend 22 in the gas ducts, may be selectively solidified or liquified.

In order to provide means for moving the liquid material out of the storage atnk 24 and into the U-bend 22 in the concentric gas ducts, there is provided a suitable source of pressure for the tank 24, which may be in the form of a pressurized gas, such as helium, communicating with the upper portion of the storage tank through a pipe 40. Other sources of pressure fluid may be used, but it is preferable that, in connection with a neutronic power reactor, the source of pressure for the liquid metal storage tank 24 be an independent source in the reactor system, in order to assure its operability at all times.

In the operation of the described value means, the cooler gas is directed from the steam generator 12 through the outer duct 20 into the reactor vessel 10, and the gases which are heated through the neutronic reaction carried on within the vessel are directed outwardly from the vessel through the inner duct 18 to the steam generator 12. During normal operation of the reactor system, the liquifiable material in the storage tank 24 is maintained in a liquid condition, through means of the heating coils 30, and the pressure in the tank is maintained at a level such that the liquid material does not pass upwardly in the feed pipes 26 and 28 beyond the upper end of the storage tank. During such normal operation there is, of course, no liquid material in the concentric ducts, 18 and 20, or in the upper portions of the feed pipes 26 and 28.

In the event that it is desired to shut off the flow of gases in the concentric ducts 18 and 20, the associated heating systems 36 and 38 are energized. The pressure in the storage tank 24 is increased sufficiently to raise the liquid material up to a position within the U-bend 22 of the concentric ducts 18 and 20, preferably at a position slightly above the upper level of the U-bend. For temporary shut downs, the material thereby placed in the U-bend 22 may be maintained in a liquid state, in which condition it can successfully block the flow of gases through the gas ducts. If the shut down period is to extend over any substantial period of time, it may be desirable to solidify the material in the U-bend 22 of the conduits, and this can be done by turning off the heating coils 38 and introducing coolant into the cooling coils 34 adjacent the U-bend. Preferably, the material in the upper portion of the feed pipes 26 and 28 is also frozen at such time through introduction of a coolant into the cooling coils 32. When it is desired to resume operation of the system, the coolant coils 34 and 32 for the ducts and the feed pipes are made inoperative and the heating coils 36 and 38 are energized to again liquify the material in the gas conduits and the feed pipes. The pressure in the storage tank 24 is reduced to permit the liquid material to return to a position within the storage tank.

It is seen, therefore, that there is provided herein a novel form of readily controllable valve means for effectively controlling the flow of gases through a plurality of concentrically arranged ducts or passages. The use of a liquifiable material insures the complete sealing off of the fluid passages and affords a more positive control means in that it can be made effective over a substantial length of bend in a pipe rather than at a purely local area as in a mechanical valve. Moreover, the described means is adaptable for use with pipes of any shape and cross-section. Then too, by using a material, which is in a liquid state at a predetermined temperature and which may be solidified, with an arrangement wherein suitable heating and cooling means are provided for the valve system, it is possible to closely control the operation of the valve means and to obtain quite rapid action for such valve means. It will be understood, of course, that the described valve means may be used alone or in conjunction with another form of valve in the conduit 16.

Although shown and described with respect to the control of the flow of gases in a gas cooled neutronic power reactor, it will be apparent that various modifications might be made, and that the valve means might be employed to advantage in connection with other apparatus, without departing from the principles of this invention. Moreover, although described particularly with respect to material which is solid at ordinary room temperature and which becomes liquid at a predetermined higher temperature, it will be apparent that the principles of this invention may also be utilized to advantage in connection with materials which are normally liquid or fluid at room temperature and which may be conveniently transformed between such fluid state and a solid state by adjusting the temperature as by cooling to a predetermined lower temperature.

We claim:

1. Means controlling the flow of gases through a plurality of concentrically disposed ducts comprising, a plurality of ducts arranged concentrically, a source of material which is liquid at a predetermined temperature and which is solid at ordinary room temperature, concentric feed pipes placing said material source in communication, respectively, with each of said concentric ducts at a U-bend portion thereof providing a trap in the ducts, means for maintaining the material at said source in a liquid state, pressure means for controllably feeding liquid material from said source through said feed pipes and into said trap in said ducts, additional heating means for maintaining at least said predetermined temperature in said feed pipes and in said trap in the ducts, and cooling means operable to controllably cool the material in said feed pipes and in said bend and to solidify the material therein, whereby the liquid material may be controllably positioned within said trap in either a liquid or solid state to prevent the flow of gases through said trap.

2. A valve means controlling the flow of pressurized and heated gases through a pair of concentrically arranged ducts at a U-bend therein comprising, concentric ducts having a longitudinal portion thereof formed into a U-bend, a storage tank disposed below the U-bend containing metal which becomes liquid at a relatively low, predetermined temperature above ordinary room temperature, a source of pressure gas communicating with an upper portion of said tank, means operable to controllably vary the pressure of said gas within said tank, a pair of concentric feed pipes extending from a position within the lower portion of said tank to said U-bend in the concentric ducts, with the inner feed pipe in fluid communication with the inner one of said concentric ducts and the outer feed pipe in fluid communication with the outer one of said concentric ducts, means for heating the metal in said tank to maintain the metal in a liquid state, a heating element adjacent said feed pipes which is operable to liquify said metal in said pipes, a cooling device adjacent said feed pipes which is operable to reduce the temperature of any of said metal contained therein below said predetermined temperature, a heating element adjacent said bend in the ducts and operable to liquify any of said metal contained in said U-bend, and a cooling means adjacent said U-bend which is operable to reduce the temperature of said metal therein below said predetermined temperature.

3. A neutronic power reactor system having a gas circulation system including a pair of concentrically arranged ducts in fluid communication with the reactor vessel, said ducts including a U-bend disposed externally of the reactor vessel, said reactor system being in combination with, a valve means comprising a storage tank disposed below the U-bend containing a metal which becomes liquid at a relatively low, predetermined temperature, a source of pressure gas communicating with an upper portion of said tank, means operable to controllably vary the pressure of said gas within said tank, a pair of concentric feed pipes extending from a position within the lower portion of said tank to said U-bend in the concentric ducts with the inner feed pipe in fluid communication with the inner one of said concentric ducts and the outer feed pipe in fliud communication with the outer one of said concentric ducts, means for heating the metal in said tank to maintain said metal in a liquid state, heat producing means associated with said feed pipes and selectively operable to liquify any of said metal disposed in said pipes, a cooling device associated with said feed pipes which is selectively operable to reduce the temperature of any of said metal disposed therein below said predetermined temperature to solidify such metal, an additional heating element adjacent said U-bend in the ducts and operable to liquify any of said metal disposed in said U-bend, and an additional cooling means adjacent said U-bend which is controllably operable to reduce the temperature of any of said metal in said U-bend below said predetermined temperature, whereby said metal may be controllably positioned within said U-bend in said concentric ducts and maintained therein in either a liquid or solid state in position to prevent the flow of said reactor gases past said U-bend.

4. A neutronic power reactor system having a gas circulating system including a pair of concentrically arranged ducts in fluid communication with the reactor vessel, said ducts including a U-bend disposed externally of the reactor, said reactor system being in combination with a liquid material valve means comprising a storage tank disposed below the U-bend containing a material which becomes liquid at a relatively low predetermined temperature, a source of pressure gas communicating with an upper portion of said tank, a pair of concentric feed pipes extending from a position within the lower portion of said tank to said U-bend in the concentric ducts, with the inner feed pipe in fluid communication with the inner one of said concentric ducts and the outer feed pipe in fluid communication with the outer one of said concentric ducts, means for heating the material in said tank to maintain the material therein in a liquid state, additional means operable to controllably maintain at least said predetermined temperature in said feed pipes and in said U-bend and means operable for controllably cooling the material in said feed pipes and in said U-bend to a temperature below said predetermined temperature to solidify the material therein.

References Cited in the file of this patent

UNITED STATES PATENTS

| | | |
|---|---|---|
| 846,078 | Wood | Mar. 5, 1907 |
| 2,782,158 | Wheeler | Feb. 19, 1957 |
| 2,874,710 | Boehme | Feb. 24, 1959 |
| 2,942,615 | Dayton | June 28, 1960 |
| 2,975,118 | Tognoni | Mar. 14, 1961 |

OTHER REFERENCES

Chemical Engineering Progress, vol. 52 (April 1952), pages 157–159, article by Cygan et al.